Patented June 11, 1940

2,204,214

UNITED STATES PATENT OFFICE 2,204,214

STIMULATION OF GROWTH FROM PLANT CUTTINGS

Nathaniel Hew Grace, Ottawa, Ontario, Canada, assignor to The Honorary Advisory Council for Scientific and Industrial Research, Ottawa, Ontario, Canada, a corporation of Canada No Drawing. Application November 30, 1939, Serial No. 306,840. In Canada October 25, 1937

10 Claims. (Cl. 47—58)

This invention relates to the stimulation of plant growth by the use of the class of synthetic organic chemicals known as plant hormones and is particularly directed to a method of treating the basal ends of plant cuttings so as to induce the formation of roots.

That the formation of roots on cuttings of plants can be initiated if the basal end of the cutting is coated with a paste, or is soaked in a dilute solution, of a growth promoting hormone, has been shown by Laibach, Müller and Schäfer (Die Naturwissenschaften, vol. 22, pp. 588-9, 1934) by Laibach (Berichte deutschen botanischen Gesellschaft, vol. 53, p. 359: 1934) and by F. W. Went (Proceedings Royal Scientific Society of Amsterdam (Proc. Kon. Akad. Wet., Amsterdam) vol. 37, July 1934, pp. 445-455). It has also been shown by Kögl, Haagen-Smit and Erxleben (Zeitschrift für physiologische Chemie, vol. 228, pp. 90-103 and vol. 228, pp. 104-112 (1934) that indolyl acetic acid is a plant growth hormone. Further Kögl (Berichte der deutschen chemischen Gesellschaft, vol. 68, pp. 16-28 (1935) showed that certain esters of indolyl acetic acid exhibited plant-growth-promoting properties.

While the application to cuttings of growth-promoting hormones in the form of paste or solution may stimulate root formation and growth, it has been found to be a hazardous procedure, which may result in much damage to the cuttings, and which is difficult to effectively control. It has been observed that considerable physiological shock occurs in cuttings of some species, particularly with solutions of hormones which are not natural products, as for example, indolyl butyric and alpha-naphthyl acetic acids. In solution treatment the hormone concentration at the surface of application of the plant cuttings is fixed and the supply of hormone is applied at once in one dose. In such treatment it is important to limit narrowly the range of concentration of the hormone solution in contact with the plant cutting.

The object of the present invention is to provide an improved method for the successful commercial application of these growth-promoting hormones to the basal portion of plant stem cuttings, in order to cause the formation of roots thereon and to stimulate the growth of the so-formed roots, in which the hormone is gradually made available to the plant cutting and the developing roots without injury thereto and in which the total amount of hormone available to the cutting and roots is controlled within well defined limits.

In preparing the plant hormone for carrying out the invention a proportion of it is intimately mixed, as, for example, by grinding in a ball mill, with an inert dust carrier to which the hormone will adhere, such as talc, chalk dolomite, clay, gypsum, silica, charcoal, starch, flour or the like or mixtures of two or more such materials in dust form. Certain of the hormone chemicals which are liquid may be dissolved in alcohol, mixed with the dust, dried and then pulverized for use.

As hormone chemicals the following may be used, indolyl acetic acid, indolyl butyric acid, indolyl propionic acid, alpha-naphthyl acetic acid, gamma-1-naphthyl butyric, and epsilon-1-naphthyl hexoic acid, their salts and esters. A mixture of gamma-1 and 2-naphthyl butyric acid is quite effective and may be more economical than the gamma-1-naphthyl butyric acid. The naphthyl acids with an even number of carbon atoms in the side chain are more effective than those with an odd number.

The freshly cut or naturally moist lower ends of plant stem cuttings are dipped into the dust, containing the plant hormone, excess dust is shaken off and the treated cuttings are planted. Cuttings need not be dipped into the dust individually; convenient lots up to 50 have been treated at the same time.

As illustrative of the results obtained, the following are given; The lower ends of stem cuttings of Deutzia crenata were dipped into dusts containing from 50 to 1000 parts per million of the plant hormones, indolyl acetic acid, indolyl butyric acid or alpha-naphthyl-acetic acid, either singly or in combination, and planted. For comparison stem cuttings of Deutzia crenata were treated with aqueous solution of from 5 to 100 parts per million of the above hormones. After 25 days it was found that 66% more of the cuttings rooted when treated with indolyl butyric acid by the present method than those treated by the solution. The corresponding increase in rooted cuttings for indolyl acetic acid was 630% and for alpha-naphthyl acetic acid 300%. Controls showed none rooted.

Cuttings of Deutzia crenata failed to root without treatment but when subjected to this dust treatment with 1000 parts of the potassium salts of gamma-1 and 2-naphthyl butyric acid per million parts of talc dust 65% rooted. When treated with the same concentration of the potassium salt of naphthyl hexoic acid substantially 55% rooted.

The lower ends of stem cuttings from Salix pentandra were dipped into dusts containing from 50 to 1000 parts per million of the above hormones. For comparison, cuttings of the same plant were treated with aqueous solutions containing from 5 to 100 parts per million of the above hormones. After 25 days it was found in the case of indolyl butyric acid that 330% more cuttings were rooted by the present than by the solution method. Corresponding increases in rooting of cuttings of 33% and 153% were obtained with indolyl acetic acid and alpha-naphthyl acetic acid.

Stem cuttings of *Ulmus americana*, when the basal portions were treated with solutions of hormones as stated above, all died. The controls also all died, but 10% of the cuttings treated by the present method have rooted. Stem cuttings of *Lonicera tartarica* were also treated by the present method and by the solution method. These showed, after 25 days, that the present method gave 240% more cuttings likely to effectively root than those treated with solutions.

Cuttings of *Lonicera tartarica*, which without treatment rooted about 25%, when treated with 1000 parts of the potassium salt of gamma-1-naphthyl butyric acid per million parts of talc dust rooted about 70%. Similar cuttings treated with the same concentration of the potassium salt of epsilon-1-naphthyl hexoic acid rooted substantially 65%.

The longer the side chain substituent of these hormone chemicals, in general, the less soluble is the acid and when the naphthyl butyric or naphthyl hexoic acids themselves are used, instead of their salts, somewhat larger proportions should be used. Above about 5000 parts per million should not be employed, otherwise damage occurs, and 250 parts per million is about the lower limit for commercial use.

It should be stated that cuttings of certain plants like *Weigelia rosea* have been found to root with both solution and dust treatments.

As stated above, it is generally fatal to cuttings if too much of the hormone chemical acts on or at the basal end of the cutting at once. It will also be observed that the range of concentration of the hormone chemicals in the dust used for treating the cuttings by the present method is much wider than in the solutions used, despite which the treatment with hormone dusts gave much improved results. It is obviously an advantage of the present method that the amount of hormone chemical in the dust is not nearly so narrowly limited as is the case with solutions. There is much less hazard to the cuttings of an excess concentration of the hormone being actually present at the dineric interface of cutting and soil and solutions. Furthermore, the supply of the hormone present in the dust adhering to the cutting is gradually supplied to and taken up by the cutting and also by its developing roots, by slowly dissolving in the moist sand or other medium in which the cuttings are placed. The actual concentrations of hormone that should be present at the surfaces of the plant cuttings and of the developing roots for best results are very low and are critical. These conditions are readily and advantageously taken care of by the present method of treatment.

It is found fatal to plant stem cuttings to treat them with a dust containing too much of the plant hormone chemicals. However, a minimum amount of substantially 10 parts of plant hormones per million parts of dust must be present in the dust or no observable effects result.

In the dust that adheres to the treated cuttings, a sufficient proportion and quantity of hormones is present to give the necessary stimulus to physiological activity when the dust hormone mixtures are prepared in the proportions indicated. For most plant cuttings a dust containing 250 parts of hormone chemicals per million parts of dust is satisfactory. Certain plants requiring high dosages should be treated with dusts containing from 1000 to 1500 parts of hormone chemicals per million parts of dust. Sensitive plant cuttings may be treated with dusts containing from 25 to 75 parts of hormone chemicals per million parts of dust. It is an advantage, in some cases, to use two or more hormone chemicals in one dust mixture.

A dust containing as much as 2000 parts of plant hormone chemical per million parts of dust applied to plant cuttings is deadly to the cuttings, except as indicated above when the acids having long side chain substituents are employed.

It is an advantage in some cases to mix with the dust and hormone chemicals portions of one or more physiologically active substances, thereby promoting both the effectiveness of the hormone substances and the development of the plant, provided that these physiologically active substances can be reduced to dust form. Substances that have nutritive value and also, in some cases, are capable of modifying the hydrogen ion concentration may be mentioned in this connection. It is also an advantage in some cases to add a small portion of a suitable disinfectant to the hormone-dust mixture before using.

Moreover it is advantageous to add hormone chemicals either in solutions of low concentration, or admixed with carrier dusts, or admixed with fertilizers to growing established plants and to rooted cuttings of plants, and also to soils in which plants are to be grown. The rate and vigor of growth are considerably stimulated when above a minimal amount of the hormone is added. It is found that there is no observable effect when less than substantially 50 milligrams of alpha-naphthyl acetic acid per acre per season is added. Somewhat larger minimal amounts are required in the case of the indole derivatives.

This application is a continuation in part of application Serial No. 195,820, filed March 14, 1938.

I claim:

1. A method of initiating root formation and growth in plant stem cuttings which comprises causing to adhere to moist and freshly cut stem portions of live plants dust containing at least one non-gaseous, organic, synthetic hormone chemical, in the proportion by weight of not less than 10 and less than 2000 parts per million parts of dust, and planting the so-treated cuttings.

2. A method of initiating root formation and growth in plant stem cuttings which comprises dipping moist and freshly cut stem portions of live plants in a dust containing not less than 10 and less than 2000 parts by weight of non-gaseous, organic, synthetic plant hormone chemical per million parts of dust and planting the so-treated cuttings.

3. In the planting of stem cuttings of live plants the improvement which comprises causing to adhere by normal contact to moist and substantially freshly cut stem portions of such plants dust containing plant hormone chemical in the proportion by weight of not less than 250 parts nor more than 1000 parts per million parts of dust, said chemical being at least one of a group consisting of indolyl acetic acid, indolyl butyric acid, indolyl propionic acid, alpha-naphthyl acetic acid, gamma-1- naphthyl butyric acid, epsilon-1-naphthyl hexoic acid, their salts and esters.

4. A composition of matter for application to the moist and substantially freshly cut basal end of plant stem cuttings which comprises dust and plant hormone chemical in the proportion by weight of not less than 250 parts nor more than 1000 parts per million parts of dust, said chemical being at least one of a group consisting of indolyl acetic acid, indolyl butyric acid, indolyl propionic acid, alpha-naphthyl acetic acid, gamma-1-naphthyl butyric acid, epsilon-1-naphthyl hexoic acid, their salts and esters.

5. A composition of matter for application to the basal end of plant stem cuttings before planting which comprises dust and adhering thereto a portion of non-gaseous, organic, synthetic plant hormone chemical not less than 10 parts and substantially less than 2000 parts per million parts of dust, said chemical being at least one of a group consisting of indolyl acetic acid, indolyl butyric acid, indolyl propionic acid, alpha-naphthyl acetic acid, gamma-1-naphthyl butyric acid, epsilon-1-naphthyl hexoic acid, their salts and esters.

6. A composition of matter for application to the moist substantially freshly cut basal end of plant stem cuttings which comprises dust and plant hormone chemical in the proportion by weight of not substantially less than 250 parts nor more than 5000 parts per million parts of dust, said chemical being at least one of a group consisting of gamma-1-naphthyl butyric acid, epsilon-1-naphthyl hexoic acid, their salts and esters.

7. A composition of matter as set forth in claim 6 wherein said chemical is a mixture of alkali metal salts of gamma-1 and 2-naphthyl butyric acid.

8. A composition of matter as set forth in claim 6 wherein said chemical is an alkali metal salt of epsilon-1-naphthyl hexoic acid.

9. A composition of matter as set forth in claim 6 wherein said chemical is a mixture of gamma-1 and 2 naphthyl butyric acids.

10. In the planting of stem cuttings of live plants the improvement which comprises causing to adhere by normal contact to moist and substantially freshly cut stem portions of such plants dust containing plant hormone chemical in the proportion by weight of not less than 250 parts nor more than about 5000 parts per million parts of dust, said chemical being at least one of a group consisting of gamma-1-naphthyl butyric acid, mixtures of gamma-1 and 2-naphthyl butyric acids, and epsilon 1-naphthyl hexoic acid, their salts and esters.

NATHANIEL HEW GRACE.